US012159202B2

(12) United States Patent
Calderbank et al.

(10) Patent No.: US 12,159,202 B2
(45) Date of Patent: Dec. 3, 2024

(54) CODESIGN OF QUANTUM ERROR CORRECTING CODES AND PHYSICAL AND LOGICAL GATES

(71) Applicant: DUKE UNIVERSITY, Durham, NC (US)

(72) Inventors: Arthur Robert Calderbank, Durham, NC (US); Jingzhen Hu, Durham, NC (US); Qingzhong Liang, Durham, NC (US)

(73) Assignee: Duke University, Durham, NC (US)

( * ) Notice: Subject to any disclaimer, the term of this patent is extended or adjusted under 35 U.S.C. 154(b) by 47 days.

(21) Appl. No.: 18/102,387

(22) Filed: Jan. 27, 2023

(65) Prior Publication Data

US 2023/0244980 A1 Aug. 3, 2023

Related U.S. Application Data

(60) Provisional application No. 63/304,387, filed on Jan. 28, 2022.

(51) Int. Cl.
| | |
|---|---|
| *G06N 10/70* | (2022.01) |
| *G06F 11/10* | (2006.01) |
| *G06N 10/20* | (2022.01) |
| *G06N 10/40* | (2022.01) |

(52) U.S. Cl.
CPC ......... *G06N 10/70* (2022.01); *G06F 11/1044* (2013.01); *G06N 10/20* (2022.01); *G06N 10/40* (2022.01)

(58) Field of Classification Search
None
See application file for complete search history.

(56) References Cited

U.S. PATENT DOCUMENTS

| | | |
|---|---|---|
| 2020/0219001 A1 | 7/2020 | Kim et al. |
| 2021/0224150 A1 | 7/2021 | Zheng et al. |
| 2021/0304051 A1 | 9/2021 | Brown et al. |
| 2021/0374591 A1 | 12/2021 | Kliuchnikov et al. |

FOREIGN PATENT DOCUMENTS

WO 2023147043 A1 8/2023

OTHER PUBLICATIONS

Michael Newman, and Henry D. Pfister, "On Optimality of CSS Codes for Transversal T", 2020, IEEE, pp. 1-16 (Year: 2020).*

(Continued)

*Primary Examiner* — Guerrier Merant
(74) *Attorney, Agent, or Firm* — Barnes & Thornburg LLP

(57) ABSTRACT

Technologies for performing error correction in a quantum circuit of a quantum computing system are disclosed. A quantum error correction code (QECC) is selected. The QECC is associated with a codespace. The quantum computing system identifies, based on one or more properties of the QECC, one or more diagonal physical gates in the quantum circuit that induces a target logical gate and preserves the codespace. The quantum computing system configures the quantum computing circuit to implement a quantum error correction protocol using the QECC and at least one of the identified diagonal physical gates.

17 Claims, 4 Drawing Sheets

(56) References Cited

OTHER PUBLICATIONS

Jingzhen Hu, Qingzhong Liang, and Robert Calderbank, "Designing the Quantum Channels Induced by Diagonal Gates" Duke (Year: 2022).*

Andrew W. Cross, "Fault-tolerant quantum computer architectures using hierarchies of quantum error-correcting codes" Massachusetts Institute of Technology (Year: 2008).*

Beale, S.J., Wallman, J.J., Gutierrez, M., Brown, K.R. and Laflamme, R., 2018. Quantum error correction decoheres noise. Physical review letters, 121(19), p. 190501.

Darmawan, A.S., Brown, B.J., Grimsmo, A.L., Tuckett, D.K. and Puri, S., 2021. Practical quantum error correction with the XZZX code and Kerr-cat qubits. PRX Quantum, 2(3), p. 030345.

Egan, L., Debroy, D.M., Noel, C., Risinger, A., Zhu, D., Biswas, D., Newman, M., Li, M., Brown, K.R., Cetina, M. and Monroe, C., 2009. Fault-tolerant operation of a quantum error-correction code, 2020. arXiv preprint arXiv:2009.11482.

Hill, C.D., Fowler, A.G., Wang, D.S. and Hollenberg, L.C., 2013. Fault-tolerant quantum error correction code conversion. Quantum Information & Computation, 13(5-6), pp. 439-451.

International Search Report and Written Opinion for Application No. PCT/US2023/011728, date of mailing Jun. 6, 2023 (13 pages).

\* cited by examiner

CODESIGN OF QUANTUM ERROR CORRECTING CODES AND PHYSICAL AND LOGICAL GATES

CROSS-REFERENCE TO RELATED APPLICATIONS

This application claims the benefit of priority from U.S. Provisional Application No. 63/304,387, filed Jan. 28, 2022, the disclosure of which is hereby incorporated by reference herein in its entirety.

GOVERNMENT LICENSE RIGHTS

This invention was made with government support under CCF-1908730 and CCF-2106213, each awarded by the National Science Foundation. The government has certain rights in the invention.

FIELD

The present disclosure generally relates to quantum error correction, and more specifically to identifying, for a given CSS code of a given codespace, each possible diagonal physical gate that induces a target logical gate and preserves the codespace.

BACKGROUND

Combining error resilience with universal computation is a known challenge in quantum computing. Particularly, various factors can affect quantum states carrying information, such as decoherence caused by environmental interactions, other types of noise, faulty gates, and so on. Consequently, achieving fault-tolerant quantum computations is vital. Unlike in classical computing however, fault tolerance in quantum computing cannot involve creating redundancy by copying quantum information due to physical impossibility.

Instead, quantum error correction codes (QECCs) provide fault tolerance by using qubit operations and measurements to correct quantum states as they are transformed by logical gates. For example, stabilizer codes append qubits to a given qubit or group of qubits to protect. A unitary encoding circuit then rotates the global state into a subspace of a larger Hilbert space, which results in a highly entangled state that corrects local noise. A Calderbank-Shor-Steane (CSS) code is a type of stabilizer code constructed from a pair of classical binary error correcting codes. The stabilizer group for CSS codes can be generated from Pauli terms that are a product of only X or only Z terms.

Typically, a QECC is designed to implement logical operators through transversal physical gates of a quantum circuit of a quantum computing system. A transversal physical gate is a tensor product of unitaries on individual code blocks. Further, magic state distillation (MSD) allows for combining traversal physical gates with an ancillary state to create a universal set of logical gates. MSD protocols use CSS codes that support a fault-tolerant non-Clifford logical gate induced by a transversal physical gate. The interaction of transversal diagonal gates and induced logical gates depends strongly on the signs of Z-stabilizers in a given CSS code. Prior approaches in quantum error correction through QECCs involve fixing a given transversal diagonal physical gate and a target logical gate and then deriving sufficient conditions on a CSS code for which the diagonal physical gate preserves the CSS code and induces the target logical gate.

SUMMARY

Embodiments presented herein disclose techniques for, given a CSS code, synthesizing each possible diagonal physical gate that induces a target logical gate and preserves the underlying codespace to generate QECCs that are preserved by a particular diagonal physical gate.

For example, an embodiment presented herein discloses a computer-implemented method for performing error correction in a quantum circuit of a quantum computing system. The method generally includes selecting, by the quantum computing system, a quantum error correction code (QECC). The QECC is associated with a codespace. The method also generally includes identifying, by the quantum computing system and based on one or more properties of the QECC, one or more diagonal physical gates in the quantum circuit that induces a target logical gate and preserves the codespace. The method also generally includes configuring, by the quantum computing system, the quantum computing circuit to implement a quantum error correction protocol using the QECC and at least one of the identified one or more diagonal physical gates.

Another embodiment presented herein discloses a quantum computing system comprising a quantum circuit having a plurality of diagonal physical gates, a processor, and a controller comprising a memory having a plurality of instructions. The plurality of instructions, when executed by the processor, causes the quantum computing system to select a quantum error correction code (QECC). The QECC is associated with a codespace. The plurality of instructions further causes the quantum computing system to identify, based on one or more properties of the QECC, one or more of the diagonal physical gates in the quantum circuit that induces a target logical gate and preserves the codespace. The plurality of instructions further causes the quantum computing system to configure the quantum computing circuit to implement a quantum error correction protocol using the QECC and at least one of the identified one or more of the plurality of diagonal physical gates.

Yet another embodiment presented herein discloses a computer-readable storage medium storing a plurality of instructions. The plurality of instructions, when executed on a processor, causes a quantum computing processor to select a quantum error correction code (QECC). The QECC is associated with a codespace. The plurality of instructions further causes the quantum computing system to identify, based on one or more properties of the QECC, one or more of the diagonal physical gates in the quantum circuit that induces a target logical gate and preserves the codespace. The plurality of instructions further causes the quantum computing system to configure the quantum computing circuit to implement a quantum error correction protocol using the QECC and at least one of the identified one or more of the plurality of diagonal physical gates.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale.

Where considered appropriate, reference labels have been repeated among the figures to indicate corresponding or analogous elements.

DETAILED DESCRIPTION

Figure 1:
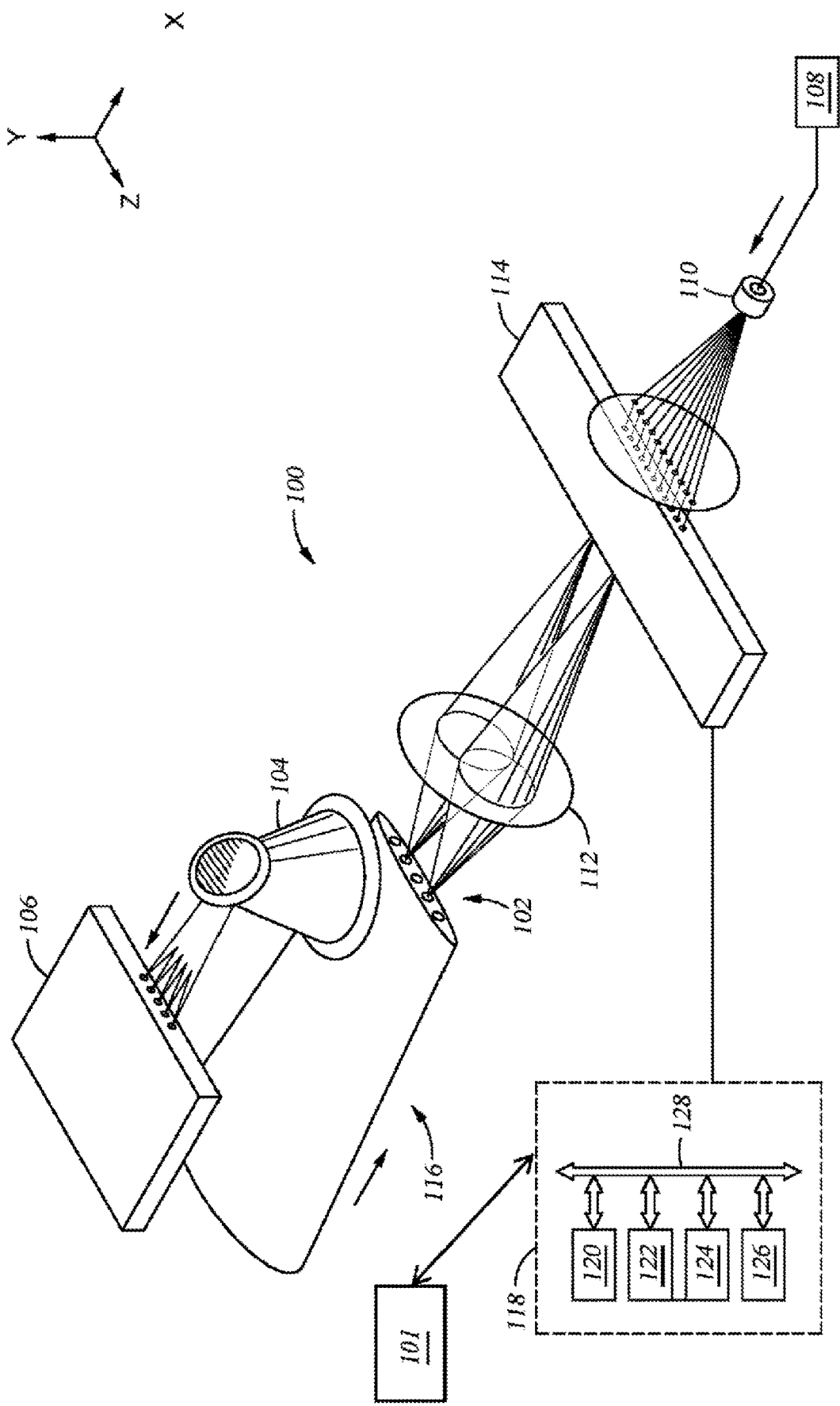
FIG. 1 is a view of an example ion trap quantum computer configured to implement quantum error correction protocols based on codes constructed under a generator coefficient framework, according to an embodiment.

Quantum error correcting codes (QECCs) protect information as the information is transformed by logical gates. The objective of fault tolerance in quantum computing suggests constructing QECCs that implement logical operators using transversal physical gates. As known, a transversal gate is a tensor product of unitaries on individual code blocks. However, the Eastin-Knill Theorem teaches that no QECC can implement a universal set of logical gates through transversal physical gates alone. Magic state injection circumvents this restriction by consuming magic states to implement non-Clifford gates. Further, state injection typically uses magic state distillation (MSD) techniques, which produce high-fidelity magic states from multiple low-fidelity states. MSD protocols use Calderbank-Shor-Steane (CSS) codes that support a fault-tolerant non-Clifford logical gate induced by a transversal physical gate.

Embodiments presented herein disclose techniques for constructing QECCs that are preserved by a diagonal physical gate within the underlying codespace. More particularly, these techniques provide a generator coefficient framework that synthesizes each possible diagonal physical gate for a CSS code that induces a target diagonal logical gate and preserves the codespace. Through the framework, the techniques enable quantum error correction optimization within a quantum computing system based on a locality of a physical gates, leading to improved fault tolerance.

In contrast to prior approaches fixing a transversal diagonal gate and target diagonal logical gate and then deriving sufficient conditions on a CSS code, this approach instead fixes a CSS code and uses the generator coefficient framework to identify each possible diagonal physical gate that induces the target diagonal logical gate based on properties associated with the CSS code. Advantageously, the generator coefficient framework enables a systematic analysis of the locality of diagonal physical operators. Further, the framework also makes it possible to derive conditions for a CSS code that are both necessary and sufficient for a diagonal physical gate to preserve the code and induce a target diagonal logical gate. Further still, using the possible diagonal physical gates, the current approach also identifies physical gates that induce the identity on the codespace for the CSS code, which enables CSS codes that mitigate noise for a particular noise system based on correlations of idling noise represented by the physical gates. The codes constructed from the framework may be used in implementing a variety of quantum error correction protocols, such as MSD.

Note, the present disclosure uses a trapped ion quantum computer as a reference example for adapting a generator coefficient framework for quantum error correction. However, one of skill in the art will recognize that in addition to trapped ion quantum computers, the embodiments may be adapted to other types of quantum computing systems, such as quantum annealing systems, superconducting quantum computers, spin qubit quantum computers, and so on.

FIG. 1 is a partial view of an example ion trap quantum computer, or system 100, for analyzing the locality of diagonal physical operators for creating QECCs within a decoherence-free subspace (DFS) of a noise system therein, according to one embodiment. The system 100 includes a classical (digital) computer 101, a system controller 118 and a quantum register that is a chain 102 of trapped ions (i.e., five shown) that extend along the Z-axis. The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128.

The RF controller 118 executes a control program which is stored in the ROM 122 or the storage unit 126 and uses the RAM 124 as a working area. The control program will include software applications that include program code that may be executed by processor in order to perform various functionalities associated with receiving and analyzing data and controlling any and all aspects of the methods and hardware used to create the ion trap quantum computer system 100 discussed herein. For example, the control program may include program code for implementing a generator coefficient framework and using the generator coefficient framework to assemble each possible diagonal physical gates of a quantum circuit in the system 100 that induce a target diagonal logical gate, derive conditions on a CSS code that are necessary and sufficient for a diagonal physical gate to preserve the CSS code and induce the logical gate, and implement protocols (e.g., Magic State Distillation) quantum error computing codes based on the identified locality of the diagonal physical gates. The control program may further include program code for directing the system controller 118 (or other error correcting components not shown) to perform error correction for quantum computations based on the QECC design techniques disclosed herein.

Given a CSS code, the generator coefficient framework synthesizes each possible diagonal physical gate that preserves the codespace and induces a target logical gate. To do so, assume that the system 100 has a [n, k=$k_1$−$k_2$, d] CSS code C by CSS(X, $C_2$; Z, $C_1^\perp$), where the [n,k2] binary code $C_2$ determines the X-stabilizers in C, and the [n, n−$k_1$] binary code $C_1^\perp$ determines the Z-stabilizers in C.

In addition, the diagonal entries of a diagonal physical gate can be indexed by binary vectors in $\mathbb{F}_2^n$. Further, as described herein, a diagonal physical gate "preserves" the CSS codespace if and only if entries from the same co-set of $C_2$ in $C_1$ (same X-logical) are identical. To realize the target logical operator, the system 100 specifies |$C_1$| out of $2^n$ diagonal entries of the diagonal physical gate. The remaining degrees of freedom can be used to optimize implementation of the diagonal physical gate within the infrastructure of system 100.

The generator coefficient framework of the embodiments described herein provides a new family of [[n=2^m−1, k=1+$\Sigma_{i=1}^{m-4}$ m−i, 3]] (m≥4) CSS codes that are preserved by physical transversal T, inducing the logical gate that can be decomposed as the inverse T gate on every qubit, the Control-Phase gate on every pair of qubits, and Control-Control-Z gate on every triple of logical qubits.

As an initial matter, in an embodiment, the disclosed generator coefficient framework may be derived using Pauli group, Clifford hierarchy, and stabilizer code concepts. Let $\imath:=\sqrt{-1}$ be the imaginary unit. Any 2×2 Hermitian matrix can be uniquely expressed as a real linear combination of the four single qubit Pauli matrices and operators $$I_2 = \begin{bmatrix} 1 & 0 \\ 0 & 1 \end{bmatrix}, X := \begin{bmatrix} 0 & 1 \\ 1 & 0 \end{bmatrix}, Z := \begin{bmatrix} 1 & 0 \\ 0 & -1 \end{bmatrix} \quad (1)$$

and Y:=ιXZ. The operators satisfy $X^2=Y^2=Z^2=I_2$, XY=−YX, XZ=−ZX, and YZ=−ZY.

Further, the system 100 denotes the binary field as $\mathbb{F}_2$={0, 1}. In addition, assume n≥1 and N=$2^n$. The system 100 denotes A⊗B as the Kronecker tensor product of two matrices A and B. Given binary vectors a=[$a_1$, $a_2$, ..., $a_n$] and b=[$b_1$, $b_2$, ..., $b_n$] with $a_j$, $b_j$,=0 or 1, the system 100 may define the following operators:

$$D(a,b):=X^{a_1}Z^{b_1}\otimes \ldots \otimes X^{a_n}Z^{b_n}, \quad (2)$$

$$E(a,b):=\imath^{ab^T \mod 4} D(a,b). \quad (3)$$

D(a, b) may have order 1, 2, or 4, but $E(a,b)^2=\imath^{2ab^T}(\imath^{2ab^T}I_N) I_N$. The system 100 may then define the n-qubit Pauli group $$\mathcal{P}_N:=\{\imath^\kappa D(a,b): a,b \in \mathbb{F}_2^n, \kappa \in \mathbb{Z}_4\}, \quad (4)$$

where $\mathbb{Z}_{2^l}$:={0,1, ..., $2^l$−1}. The n-qubit Pauli matrices form an orthonormal basis for the vector space of N×N complex matrices ($\mathbb{C}^{N\times N}$) under the normalized Hilbert-Schmidt inner product ⟨A, B⟩ :=Tr($A^\dagger$B)/N. The symplectic inner product is ⟨[a, b|, |c, d]⟩ s=$ad^T$+$bc^T$ mod 2. Because XZ=−ZX, $$E(a,b)E(c,d)=(-1)^{\langle [a,b|,|c,d]\rangle s} E(c,d)E(a,b) \quad (5)$$

As used herein, the Dirac notation |•⟩ represents the basis states of a single qubit in $\mathbb{C}^2$. For any v=[$v_1$, $v_2$, ..., $v_n$]∈ $\mathbb{F}_2^n$, |v⟩ ⊗|$v_1$⟩ ⊗|$v_2$⟩ ⊗ ... ⊗|$v_n$⟩ , the standard basis vector in $\mathbb{C}^N$ with 1 in the position indexed by v and 0 elsewhere. The Hermitian transpose of |v⟩ can be expressed as ⟨v|=|v⟩ $^\dagger$.

The first level of the Clifford hierarchy is defined as the Pauli group $\mathcal{C}^1$= $\mathcal{P}_N$. For l≥2, the system 100 defines levels l recursively as $$\mathcal{C}^l:=\{U\in \mathbb{U}_N: U \mathcal{P}_N U^\dagger \subset \mathcal{C}^{l-1}\}, \quad (6)$$

where $\mathbb{U}_N$ is the group of N×N unitary matrices. The second level is the Clifford group, which, in combination of any unitary from a higher level may be used to approximate any unitary operator arbitrarily well, forming a universal set for quantum computations. An example of a non-Clifford unitary that can be used is the T gate in the third level defined by $$T = Z^{\frac{1}{4}} \equiv e^{-\frac{\imath\pi}{8}Z}.$$

Let $\mathcal{D}_N$ represent the N×N diagonal matrices and $\mathcal{C}_d^{(l)}:=\mathcal{C}^{(l)} \cap \mathcal{D}_N$. The diagonal gates at each level in the hierarchy form a group, but for l≥3, the gates in $\mathcal{C}^{(l)}$ no longer form a group. Further, note that $\mathcal{C}_d^{(l)}$ can be generated using the "elementary" unitaries $$C^{(0)}Z^{\frac{1}{2l}}, C^{(1)}Z^{\frac{1}{(2^{l-1})}}, \ldots, C^{(l-2)}Z^{\frac{1}{2}}, C^{(l-1)}Z, \text{ where}$$

$$C^{(i)}Z^{\frac{1}{2j}} := \sum_{u \in \mathbb{F}_2^{i+1}} |u\rangle\langle u| + e^{\imath\frac{\pi}{2^j}}|1\rangle\langle 1|$$

and 1 ∈ $\mathbb{F}_2^{i+1}$ denotes the vector with every entry 1.

The system 100 may define a stabilizer group $\mathcal{S}$ to be a commutative subgroup of Pauli group $P_N$, where every group element is Hermitian and no group element is −$I_N$. Further, $\mathcal{S}$ has dimension r if $\mathcal{S}$ can be generated by r independent elements, as $\mathcal{S}$ =($v_i E(c_i, d_i)$: i=1, ..., r), where $v_i \in \{\pm 1\}$ and $c_i$, $d_i \in \mathbb{F}_2^n$. Because $\mathcal{S}$ is commutative, ⟨ [$c_i$, $d_i$], [$c_j$, $d_j$]⟩ s=$c_i d_j^T$+$d_i c_j^T$=0 mod 2.

Given a stabilizer group $\mathcal{S}$, the corresponding stabilizer code is fixed subspace $\mathcal{V}(\mathcal{S}):=\{|\varphi\rangle \in \mathbb{C}^N: g|\varphi\rangle =|\varphi\rangle$ for all g∈ $\mathcal{S}$ }. $\mathcal{V}(\mathcal{S})$ corresponds to a stabilizer code because $\mathcal{V}(\mathcal{S})$ encodes k:=n−r logical qubits into n physical qubits. The minimum distance d is defined as the minimum weight of any operator in $\mathcal{N}_{P_N}(\mathcal{S})\backslash \mathcal{S}$. Here, the weight of a Pauli operator is the number of qubits on which it acts non-trivially (as X, Y, or Z), and $\mathcal{N}_{P_N}(\mathcal{S})$ denotes the normalizer of $\mathcal{S}$ in $P_N$.

For any Hermitian Pauli matrix E(c, d) and v∈ {±1}, the operator $$\frac{I_N + vE(c, d)}{2}$$

projects onto the v-eigenspace of E(c, d). Thus, the projector onto the codespace $\mathcal{V}(\mathcal{S})$ of the stabilizer code defined by $\mathcal{S} = \langle v_i E(c_i, d_i): i=1, \ldots, r \rangle$ is $$\Pi_S = \prod_{i=1}^{r} \frac{(I_N + v_i E(c_i, d_i))}{2} = \frac{1}{2^r} \sum_{j=1}^{2^r} \epsilon_j E(a_j, b_j), \quad (7)$$

where $\epsilon_j \in \{\pm 1\}$ is a character of the group $\mathcal{S}$ and is determined by the signs of the generators that produce $E(a_j, b_j)$: $\epsilon_j E(a_j, b_j) = \prod_{t \in J \subset \{1,2,\ldots,r\}} v_t E(c_t, d_t)$ for a unique J.

As known, a CSS code is a particular type of stabilizer code with generators that can be separated into strictly X-type and strictly Z-type operators. For example, assume the presence of two classical binary codes $\mathcal{C}_1, \mathcal{C}_2$ such that $\mathcal{C}_2 \subset \mathcal{C}_1$, and also assume that $\mathcal{C}_1^\perp, \mathcal{C}_2^\perp$ denote the dual codes. Note that $\mathcal{C}_1^\perp \subset \mathcal{C}_2^\perp$. Further assume that $\mathcal{C}_2 = \langle c_1, c_2, \ldots, c_{k_2} \rangle$ is an [n, $k_2$] code and that $\mathcal{C}_1^\perp = \langle d_1, d_2, \ldots, d_{n-k_1} \rangle$ is an [n, n–$k_1$] code. The corresponding CSS code has the stabilizer group $$\mathcal{S} = \left\langle v_{(c_i,0)} E(c_i, 0), v_{(0,d_j)} E(0, d_j) \right\rangle_{i=1;\ j=1}^{i=k_2;\ j=n-k_1} = $$
$$\left\{ \epsilon_{(a,0)} \epsilon_{(0,b)} E(a, 0) E(0, b) : a \in \mathcal{C}_2, b \in \mathcal{C}_1^\perp \right\},$$

where $v_{(c_i,0)}, v_{(0,d_j)}, \epsilon_{(a,0)}, \epsilon_{(0,b)} \in \{\pm 1\}$. The system 100 captures sign information through character vectors $$y \in \frac{\mathbb{F}_2^n}{\mathcal{C}_1}, r \in \mathbb{F}_2^n/\mathcal{C}_2^\perp$$

such that for any $\epsilon_{(a,0)} \epsilon_{(0,b)} E(a,0) E(0,b) \in \mathcal{S}$, $\epsilon_{(a,0)} = (-1)^{ar^T}$ and $\epsilon_{(0,b)} = (-1)^{by^T}$. If $\mathcal{C}_1$ and $\mathcal{C}_2^\perp$ can correct up to t errors, then $\mathcal{S}$ defines an [[n, k=$k_1$–$k_2$, d]] CSS code with d≥2t+1, which can be represented as CSS(X, $\mathcal{C}_2$, r; Z, $\mathcal{C}_1^\perp$, y). If $G_2$ and $G_1^\perp$ are the generator matrices for $\mathcal{C}_2$ and $\mathcal{C}_1^\perp$, respectively, then the (n–$k_1$+$k_2$)×(2n) matrix $$G_S = \begin{bmatrix} G_2 & \\ & G_1^\perp \end{bmatrix} \quad (8)$$

generates $\mathcal{S}$. Further, because embodiments pertain to diagonal gates, assume that r=0.

Figure 2:
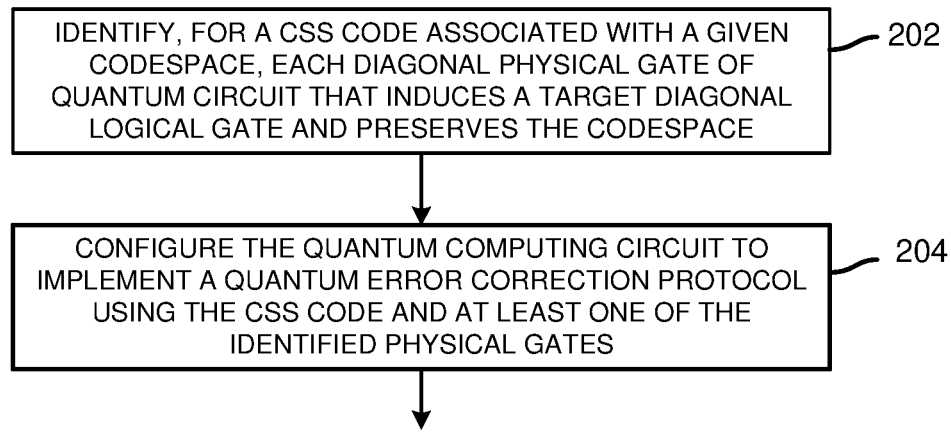
FIG. 2 is a flow diagram of an example method for implementing a quantum error correction protocol based on codes constructed under a generation coefficient framework, according to an embodiment.
Figure 3:
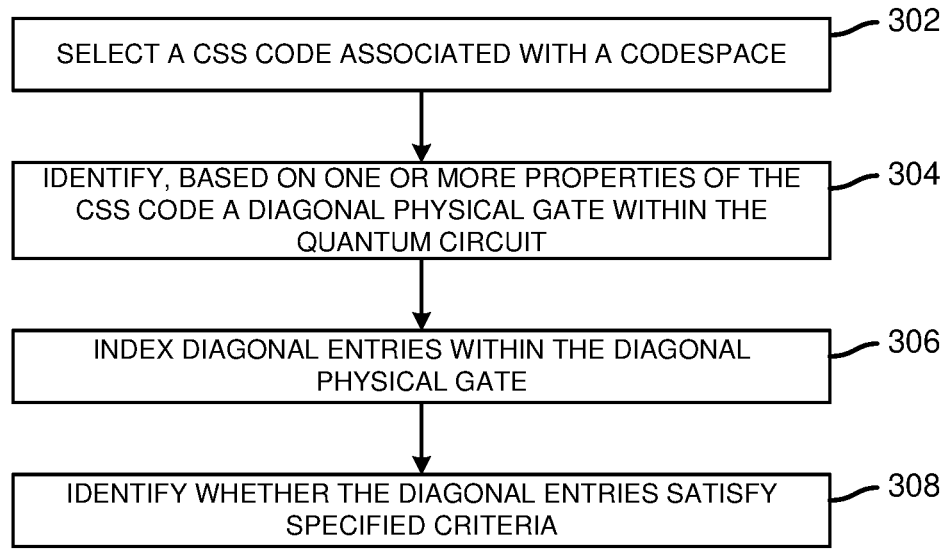
FIG. 3 is a flow diagram of an example method for identifying, from a CSS code, diagonal physical gates that induce a target diagonal logical gate and preserve a codespace associated with the code, according to an embodiment.

Referring now to FIG. 2, the system 100, in operation, may perform a method 200 for implementing a generator coefficient framework for quantum error correction is described. As shown, the method 200 begins in block 202, in which the system 100 identifies, for a CSS code in a given codespace, each possible diagonal physical gate that induces a target diagonal logical gate and preserves the codespace. To do so for example, turning briefly to a method 300 of FIG. 3, the system 100 may select (or otherwise obtain) a CSS code (at block 302), identify a diagonal physical gate within the quantum circuit (304), index diagonal entries within the identified gate (306), and identify whether the entries satisfy specified criteria, as further described below (308). Particularly, in an embodiment, the generator coefficient framework describes the evaluation of stabilizer code states under a physical diagonal gate $$U_z = \sum_{u \in \mathbb{F}_2^n} d_u |u\rangle\langle u|, \text{ where } |u\rangle\langle u| = \frac{1}{2^n} \sum_{v \in \mathbb{F}_2^n} (-1)^{uv^T} E(0, v).$$

$U_z$ can be expanded in the Pauli basis:

$$U_z = \sum_{v \in \mathbb{F}_2^n} f(v) E(0, v), \quad (9)$$

where $$f(v) = \frac{1}{2^n} \sum_{u \in \mathbb{F}_2^n} (-1)^{uv^T} d_u \quad (10)$$

The Hadamard gate $H_{2^n}$ connects the coefficients in the standard basis with those in the Pauli basis as follows $$[f(v)]_{v \in \mathbb{F}_2^n} = [d_u]_{u \in \mathbb{F}_2^n} H_{2^n}, \quad (11)$$

where $H = \frac{1}{\sqrt{2}} (|00\rangle\langle 00| + |01\rangle\langle 01| + |10\rangle\langle 10| - |11\rangle\langle 11|)$ and $H_{2^n} = H \otimes H_{2^{n-1}} = H^{\otimes n}$ is the Hadamard gate.

In an embodiment, a logical channel can be induced by a physical diagonal gate $U_z$ on a [[n, k, d]] CSS(X, $\mathcal{C}_2$; Z, $\mathcal{C}_1^\perp$, y) code resulting from preparing any code state $\rho_1$, applying $U_z$ to the code state $\rho_1$ to obtain $\rho_2$, using X-stabilizers to measure $\rho_2$ to obtain syndrome μ with probability $\rho_\mu$ and the post measurement state $\rho_3$, and applying a Pauli correction to $\rho_3$ to obtain $\rho_4$. The correction might induce some undetectable Z-logical $\epsilon_{(0, \gamma_\mu)} E(0, \gamma_\mu)$ with $\gamma_0$=0. If $B_\mu$ is the induced logical operator corresponding to syndrome μ, then the system 100 may express the evolution of code states as $$\rho_4 = \sum_{\mu \in \frac{\mathbb{F}_2^n}{\mathcal{C}_2^\perp}} B_\mu \rho_1 B_\mu^\dagger \quad (12)$$

In an embodiment, the generator coefficients $A_{\mu,\gamma}$ are obtained by expanding the logical operator $B_\mu$ in terms of Z-logical Pauli operators $\epsilon_{(0, \gamma_\mu)} E(0, \gamma_\mu)$.

$$B_\mu = \epsilon_{(0,\gamma_\mu)} E(0,\gamma_\mu) \sum_{\gamma \in \mathcal{C}_2^\perp/\mathcal{C}_1^\perp} A_{\mu,\gamma} \epsilon_{(0,\gamma)} E(0,\gamma) \quad (13)$$

where $\epsilon_{(0,\gamma_\mu)} E(0,\gamma_\mu)$ models the Z-logical Pauli correction introduced by the decoder. For each pair of an X-syndrome $$\mu \in \frac{\mathbb{F}_2^n}{\mathcal{C}_2^\perp}$$

and a logical $\gamma \in \mathcal{C}_2^\perp/\mathcal{C}_1^\perp$, the generator coefficient $A_{\mu,\gamma}$ corresponding to $U_z$ is $$A_{\mu,\gamma} = \sum_{z \in \mathcal{C}_1^\perp + \mu + \gamma} \epsilon_{(0,z)} f(z) \quad (14)$$

where $\epsilon_{(0,z)} (-1)^{zy^T}$ is the sign of the Z-stabilizer E(0, z). The selected Z-logical and X-syndromes are not unique, but different choices only differ by global phase. Generator coefficients use the CSS code to organize the Pauli coefficients of $U_z$ into groups and to balance them by tuning the signs of the Z-stabilizers. The system 100 may use (10) to simplify (14) as $$A_{\mu, \gamma} = \frac{1}{2^n} \sum_{u \in \mathbb{F}_2^n} \Sigma_{z \in \mathcal{C}_1^\perp + \mu + \gamma} (-1)^{zy^T} (-1)^{zu^T} d_u = \frac{1}{|\mathcal{C}_1|} \Sigma_{u \in \mathcal{C}_1} (-1)^{(\mu \oplus \gamma) u^T} d_{u \oplus y}, \quad (15)$$

where $|\mathcal{C}_1|=2^{k_1}$ is the size of $\mathcal{C}_1$. The system 100 may organize the generator coefficients in a matrix $M_{(\frac{\mathbb{F}_2^n}{\mathcal{C}_2^\perp},\frac{\mathcal{C}_2^\perp}{\mathcal{C}_1^\perp})}$ with rows indexed by X-syndromes and Z-logicals, $$M_{\frac{\mathbb{F}_2^n}{\mathcal{C}_2^\perp},\frac{\mathcal{C}_2^\perp}{\mathcal{C}_1^\perp}} = \begin{bmatrix} [A_{\mu=0,\gamma}]_{\gamma \in \mathcal{C}_2^\perp/\mathcal{C}_1^\perp} \\ [A_{\mu=\mu_1,\gamma}]_{\gamma \in \mathcal{C}_2^\perp/\mathcal{C}_1^\perp} \\ \vdots \\ [A_{\mu=\mu_{2^{k_1}-1},\gamma}]_{\gamma \in \mathcal{C}_2^\perp/\mathcal{C}_1^\perp} \end{bmatrix}_{\mu \in \frac{\mathbb{F}_2^n}{\mathcal{C}_2^\perp}}.$$

For fixed $\mu \in \frac{\mathbb{F}_2^n}{\mathcal{C}_2^\perp}$, the generator coefficients may be defined as $$[A_\mu, \gamma]_{\gamma \in \mathcal{C}_2^\perp/\mathcal{C}_1^\perp} = \frac{1}{|\mathcal{C}_1|}[d_{u \oplus y}]_{u \in \mathcal{C}_1} H^\mu_{(\mathcal{C}_1,\frac{\mathcal{C}_2^\perp}{\mathcal{C}_1^\perp})}, \quad (17)$$

where $H^\mu_{(\mathcal{C}_1,\frac{\mathcal{C}_2^\perp}{\mathcal{C}_1^\perp})} = [(-1)^{(\mu \oplus \gamma)u^T}]_{u \in \mathcal{C}_1, \gamma \in \mathcal{C}_2^\perp/\mathcal{C}_1^\perp}$ In an embodiment, the physical gate $U_z$ preserves a CSS codespace if and only if $$\sum_{\gamma \in \frac{\mathcal{C}_2^\perp}{\mathcal{C}_1^\perp}} |A_0, \gamma|^2 = \sum_{\gamma \in \frac{\mathcal{C}_2^\perp}{\mathcal{C}_1^\perp}} \overline{A_0, \gamma} A_0, \gamma = 1$$

Particularly, invariance of the codespace is equivalent to requiring a logical operator induced by the trivial syndrome $B_{\mu=0}$ to be unitary. Further, (18) is also equivalent to $$[A_{\mu \neq 0, \gamma}]_{\gamma \in \frac{\mathcal{C}_2^\perp}{\mathcal{C}_1^\perp}} = 0.$$

The induced logical operator is $$U_Z^L = \sum_{\alpha \in \mathbb{F}_2^k} A_{0,g(\alpha)} E(0,\alpha) = \frac{1}{|\mathcal{C}_i|} \sum_{\alpha \in \mathbb{F}_2^k} \sum_{u \in \mathcal{C}_1} (-1)^{g(\alpha)u^T} d_{u \oplus y} E(0,\alpha), \quad (19)$$

where g:

$$\mathbb{F}_2^k \to \frac{\mathcal{C}_2^\perp}{\mathcal{C}_1^\perp}$$

is a bijective map defined by $$g(\alpha) = \alpha G_{\frac{\mathcal{C}_2^\perp}{\mathcal{C}_1^\perp}}, \text{ and } G_{\frac{\mathcal{C}_2^\perp}{\mathcal{C}_1^\perp}}$$

is one choice of the generator matrix of the Z-logicals $$\frac{\mathcal{C}_2^\perp}{\mathcal{C}_1^\perp}.$$

As an example, the [[15,1,3]] punctured quantum Reed-Muller code is a CSS(X, $\mathcal{C}_2$, Z, $\mathcal{C}_1^\perp$, y=0) code, where $\mathcal{C}_2$ is generated by degree one monomials, $x_1$, $x_2$, $x_3$, $x_4$, and $\mathcal{C}_1^\perp = \langle x_1, x_2, x_3, x_4, x_1x_2, x_1x_3, x_1x_4, x_2x_3, x_2x_4, x_3x_4 \rangle$, with the first coordinate removed in $\mathcal{C}_2$ and $\mathcal{C}_1^\perp$. The code is also a triorthogonal code for which a physical transversal T gate, $$U_Z = \sum_{u \in \mathbb{F}_2^n} (e^{\frac{i\pi}{4}})^{wH(u)} |u\rangle\langle u|,$$

induces a logical transversal T gate up to some Clifford gates. Here, $wH(u) = uu^T$ denotes the Hamming weight of the binary vector u. Note that $\mathcal{C}_1$ here is the classical punctured Reed-Muller (1,4) code with weight distribution given in Table I below:

TABLE I

| The Weight Distribution of $\mathcal{C}_1$ for the [[15,1,3]] Code | | | | |
|---|---|---|---|---|
| Weight | 0 | 7 | 8 | 15 |
| Frequency | 1 | 15 | 15 | 1 |

Then, $d_u = 1$ for $u \in \mathcal{C}_1$ for which $wH(u) = 0$ or 8, and $$d_u = e^{-\frac{i\pi}{4}}$$

for $u \in \mathcal{C}_1$ for which $wH(u) = 7$ or 15. Since the Z-logical $\gamma = 1$, the all-one vector, it only changes the signs of $d_u$ with odd weight. Based on the (19), the induced logical operator is $$U_Z^L = \frac{16}{32}(1 + e^{-\frac{i\pi}{4}})E(0,0) + \frac{16}{32}(1 - e^{-\frac{i\pi}{4}})E(0,1) = T^\dagger \quad (20)$$

The induced logical operator is completely specified by $|\mathcal{C}_1|$ diagonal entries in the physical gate $U_z$. Given a CSS code and a target logical gate, the constraints on the corresponding physical gates only apply to diagonal elements corresponding to the coset $\mathcal{C}_1 + y$.

As known, quadratic form diagonal (QFD) physical gates are diagonal unitaries of the form $$\tau_R^{(l)} = \sum_{v \in \mathbb{F}_2^n} \xi_l^{vRv^T \bmod 2^l} |v\rangle\langle v|, \quad (21)$$

where $l \geq 1$ is an integer, $$\xi_l = e^{i\frac{\pi}{2^{l-1}}},$$

and R is an n×n symmetric matrix with entries in $\mathbb{Z}_{2^l}$, the ring of integers modulo $2^l$. Note that the exponent $vRv^T \in \mathbb{Z}_{2^l}$. When l=2 and R is binary, the system 100 is able to obtain diagonal Clifford unitaries. As known, QFD gates include all 1-local and 2-local diagonal unitaries in the Clifford hierarchy. When $$R = I_{2^n}, \tau_R^{(l)} = \left(Z^{\frac{1}{2^{l-1}}}\right)^{\otimes n}$$ (5)

represents the transversal Z-rotation through angle $$\frac{\pi}{2^l}.$$

Consider a CSS(X, $\mathcal{C}_2$; Z, $\mathcal{C}_1^\perp$) code where y is the character vector of the Z-stabilizers. In such a case, a QFD gate of $$\tau_R^{(l)} = \sum_{v \in \mathbb{F}_2^n} \xi_l^{vRv^T \bmod 2^l} |v\rangle\langle v|$$ (20)

preserves the codespace $\mathcal{V}(\mathcal{S})$ if and only if $$2^l | (v_1 R v_1^T - v_2 R v_2^T)$$ (22)

for all $v_1, v_2 \in \mathcal{C}+y$ such that $v_1 \otimes v_2 \in \mathcal{C}_2$. It follows from (15) that $$|A_0, \gamma|^2 = \frac{1}{|\mathcal{C}_1|^2} \Sigma_{v \in \mathcal{C}} s(v, y) \sum_{y \in \frac{\mathcal{C}_2^\perp}{\mathcal{C}_1^\perp}} (-1)^{\gamma v^T},$$ (23)

where $$s(v, y) := \Sigma_{v_1 \in \mathcal{C}_1 - v} \xi_l^{v_1 R v_1^T - (v \oplus v_1) R (v \oplus v_1)^T \bmod 2^l}$$ (24)

Using (23), the system 100 may simplify (18) to obtain $$1 = \sum_{y \in \frac{\mathcal{C}_2^\perp}{\mathcal{C}_1^\perp}} |A_0, \gamma|^2 = \frac{1}{|\mathcal{C}_1|^2} \sum_{v \in \mathcal{C}_1} s(v, y) \sum_{y \in \frac{\mathcal{C}_2^\perp}{\mathcal{C}_1^\perp}} (-1)^{\gamma v^T} =$$ (25)

$$\frac{\sum_{v \in \mathcal{C}_2} \sum_{v_1 \in \mathcal{C}_1 + y} \xi_l^{v_1 R v_1^T - (v \oplus v_1) R (v \oplus v_1)^T \bmod 2^l}}{|\mathcal{C}_1||\mathcal{C}_2|}$$

which requires each term to contribute 1 to the summation. The system 100 may set $v_2 = v \otimes v_1$. Note, (22) implies that the divisibility conditions corresponding to successive levels only differ by a factor of 2. Given a CSS code for which a transversal diagonal physical gate at level l induces a logical operator at the same level, climbing techniques can be used to obtain a CSS code for which a transversal diagonal physical gate at level l+1 induces a logical operator also at level l+1. More particularly, (22) is simplified to characterize all possible CSS codes fixed by $$\tau_{I_{2^n}}^{(l)}$$

that are determined by two Reed-Muller codes in the case that the QFD gate is a transversal Z-rotation through angle $$\frac{\pi}{2^l}(R = I_{2^n}).$$

As another example, assume the system 100 selects Reed-Muller codes $\mathcal{C}_1 = \text{RM}(r_1, m) \supset \mathcal{C}_2 = \text{RM}(r_2, m)$ with $r_1 > r_2$. The $$\left[\left[n = 2^m, k = \sum_{j=r_2+1}^{r_1} \binom{m}{j}, d = 2^{\min(r_2+1, m-r_1)}\right]\right] CSS(X, \mathcal{C}_2, Z, \mathcal{C}_1^\perp, y = 0)$$

code is preserved by $$R_Z\left(\frac{\pi}{2^{l-1}}\right)$$

if and only if $$l \leq \begin{cases} \left\lfloor \frac{m-1}{r_1} \right\rfloor + 1, & \text{if } r_2 = 0 \\ \min\left\{\left\lfloor \frac{m-r_2-1}{r_1} \right\rfloor + 1, \left\lfloor \frac{m-r_1}{r_2} \right\rfloor + 1\right\}, & \text{if } r_2 \neq 0 \end{cases}$$ (26)

Given a CSS code, the generator coefficient framework not only represents when a physical diagonal gate preserves the codespace, but it also characterizes all possible physical gates that realize a target diagonal logical gate. For example, assume that the logical operator is the identity operator. The physical gate $$U_z = \sum_{u \in \mathbb{F}_2^n} d_u |u\rangle\langle u|$$

acts as the logical identity on the CSS codespace if and only if $d_{u \otimes y}$ are the same for all $u \in \mathcal{C}_1$. Particularly, it follows that from (19) that $U_Z^L = I_{2^k}$ if and only if $$|A_{\mu=0, \gamma=0}| = \frac{1}{|\mathcal{C}_1|} \Sigma_{u \in \mathcal{C}_1} d_{u \oplus y} = 1,$$ (27)

which is the equivalent to requiring that $2^{k_1}$ diagonal entries of the physical gate $U_z$ indexed by $\mathcal{C}_1 + y$ are identical.

The mapping from a physical gate that preserves a given CSS code to the induced logical operator is a group homomorphism. The kernel of this homomorphism is the group of physical gates that induce the logical identity. Thus, this enables code design within a decoherence-free subspace (DFS) for a noise system within a quantum computing system, such as the system 100. For homogeneous coherent noise (having the same angle on each physical qubit), assume, for $U_z$, $$U_z = \begin{bmatrix} 1 & 0 \\ 0 & e^{i\theta} \end{bmatrix}^{\otimes n} = \sum_{u \in \mathbb{F}_2^n} \left(e^{i\theta}\right)^{wH(u)} |u\rangle\langle u|,$$ (28)

with $\theta \in (0, 2\pi)$. In an embodiment, the system 100 may be configured to implement CSS codes that are oblivious to such gates by ensuring that all Hamming weights in the coset $\mathcal{C}_1 + y$ are the same. For coherent noise with inhomogeneous angles, this enables error code design to mitigate such correlated errors.

To realize a non-trivial diagonal logical gate on a given CSS code, the system 100 may characterize all possible physical gates in terms of a target logical gate. Given a CSS(X, $C_2$; Z, $C_1^\perp$, y) code, the diagonal physical gate $$U_z = \sum_{u \in \mathbb{F}_2^n} d_u |u\rangle\langle u|$$

induces the logical gate $$U_Z^L = \sum_{\alpha \in \mathbb{F}_2^k} e^{i\theta\alpha} |\alpha\rangle\langle\alpha|$$

if and only if $$d_{u \oplus y} = e^{i\theta\alpha} \text{ for } G_{\frac{C_2^\perp}{C_1^\perp}} u^T = \alpha^T. \tag{29}$$

It follows from (19) that the Pauli co-efficients of the logical operator are the same as the generator coefficients corresponding to the trivial syndrome, $$[A_{0,\gamma}]_{\gamma \in \frac{C_2^\perp}{C_1^\perp}} = [e^{i\theta\alpha}]_{\alpha \in \mathbb{F}_2^k} H_{2^k} \tag{30}$$

where $H_{2^k} = \frac{1}{2^k}\left[(-1)^{\alpha \beta^T}\right]_{\alpha, \beta \in \mathbb{F}_2^k}$ is the normalized Walsh-Hadamard matrix. Given the definition of generator coefficients in (17), (30) may be simplified as $$\frac{1}{|\mathcal{C}_1|}[d_{u \oplus y}]_{u \in \mathcal{C}_1} H^{\mu=0}_{\left(\mathcal{C}_1, \frac{\mathcal{C}_2^\perp}{\mathcal{C}_1^\perp}\right)} = [e^{i\theta\alpha}]_{\alpha \in \mathbb{F}_2^k} H_{2^k}, \tag{31}$$

where $$H^{\mu=0}_{\left(\mathcal{C}_1, \frac{\mathcal{C}_2^\perp}{\mathcal{C}_1^\perp}\right)} = \left[(-1)^{\gamma \mu^T}\right]_{u \in \mathcal{C}_1, \gamma \in \frac{\mathcal{C}_2^\perp}{\mathcal{C}_1^\perp}} = [(-1)^{BG_{\frac{\mathcal{C}_2^\perp}{\mathcal{C}_1^\perp}} u^T}]_{u \in \mathcal{C}_1, \beta \in \mathbb{F}_2^k} \tag{32}$$

has $2^{k_1} = |\mathcal{C}_1|$ rows and $$2^k = \left|\frac{\mathcal{C}_2^\perp}{\mathcal{C}_1^\perp}\right|$$

columns. The system 100 may permute the entries in $[d_{u \otimes y}]_{u \in \mathcal{C}_1}$ and the rows in $$H^{\mu=0}_{\left(\mathcal{C}_1, \frac{\mathcal{C}_2^\perp}{\mathcal{C}_1^\perp}\right)}$$

to group together elements in the same coset of $\mathcal{C}_2$ in $\mathcal{C}_1$ so that $$H^{\mu=0}_{\left(\mathcal{C}_1, \frac{\mathcal{C}_2^\perp}{\mathcal{C}_1^\perp}\right)}\left(H^{\mu=0}_{\left(\mathcal{C}_1, \frac{\mathcal{C}_2^\perp}{\mathcal{C}_1^\perp}\right)}\right)^T = \begin{bmatrix} B & & \\ & \ddots & \\ & & B \end{bmatrix} \tag{33}$$

where B is a $2^{k_1-k} \times 2^{k_1-k}$ block with all entries being $2^k$, and there are $2^k$ blocks B. For $$w \in \frac{\mathcal{C}_1}{\mathcal{C}_2},$$

the system 100 may define the averaging sum over the coset $\mathcal{C}_2 + w$ as $$S_{\mathcal{C}_2}(w) := \frac{1}{2^{k_1-k}} \sum_{u \in \mathcal{C}_2 + w} d_{u \oplus y}. \tag{34}$$

Then, multiplying both sides of (31) on the right by $$\left(H^{\mu=0}_{\left(\mathcal{C}_1, \frac{\mathcal{C}_2^\perp}{\mathcal{C}_1^\perp}\right)}\right)^T$$

results in $$[S_{\mathcal{C}_2}(w)]_{w \in \frac{\mathcal{C}_1}{\mathcal{C}_2}} \otimes 1_{2^{k_1-k}} = [e^{i\theta\alpha}]_{\alpha \in \mathbb{F}_2^k} K, \tag{35}$$

where $$1_{2^{k_1-k}}$$

denotes the vector of length $2^{k_1-k}$ with every entry 1 and $$K = H_{2^k}\left(H^{\mu=0}_{\left(\mathcal{C}_1, \frac{\mathcal{C}_2^\perp}{\mathcal{C}_1^\perp}\right)}\right)^T = \left[\frac{1}{2^k}\sum_{\beta \in \mathbb{F}_2^k}(-1)^{\beta\left(\alpha^T \oplus G_{\frac{\mathcal{C}_2^\perp}{\mathcal{C}_1^\perp}} u^T\right)}\right]_{\alpha \in \mathbb{F}_2^k, u \in \mathcal{C}_1} \tag{36}$$

Comparing the two sides of (35), for $$w \in \frac{\mathcal{C}_1}{\mathcal{C}_2},$$

$$S_{C_2}(w) = \frac{1}{2^k}\sum_{\alpha\in\mathbb{F}_2^k}e^{i6\alpha}\sum_{\beta\in\mathbb{F}_2^k}(-1)^{\beta(\alpha)\oplus G\begin{bmatrix}C_2^\perp\\C_1\end{bmatrix}u^T} \quad (37)$$

$$= e^{i6\alpha(u)}, \text{ for } \alpha(u)^T = G\begin{bmatrix}C_2^\perp\\C_1\end{bmatrix}u^T. \quad (38)$$

The result follows due to the norm of the averaging sum $|S_{C_2}(w)|=1$ and $|d_{u\otimes y}|=1$ for all $u\in C_2 + w$ ((to be unitary).

The above provides a family of $[[n=2^{m-1}, k=1+\Sigma_{i=1}^{m-4} m-i, 3]]$ ($m\geq 4$) CSS codes that are preserved by a physical transversal T, inducing the logical gate that can be decomposed as the inverse T gate on every qubit, the Control-Phase gate on every pair of qubits, and Control-Control-Z gate on every triple of logical qubits.

For instance, assume that $C_2=\{u_0, u_1, \ldots, u_{2^{k_2}-1}\}$. Given the above, it follows that a diagonal physical gate $$U_Z = \sum_{u\in\mathbb{F}_2^n}d_u|u\rangle\langle u|$$

preserves the CSS(X, $C_2$; Z, $C_1^\perp$, y) codespace if and only if for all $w\in\frac{C_1}{C_2}$, $$d_{u_0\oplus w\oplus y} = d_{u_1\oplus w\oplus y} = \ldots = d_{u_{2^{k_2}-1}\oplus w\oplus y}. \quad (39)$$

The aforementioned (39) allows the system 100 to directly determine whether a physical gate preserves a particular CSS code and further enables design of CSS codes that are preserved by a particular physical diagonal gate. In addition, (39) also implies that a CSS code with more Z-stabilizers (smaller $|C_1|$) can be preserved by more physical diagonal gates.

Referring back to Table I, all the weight-0 and weight-8 vectors are in $C_2$ while all the weight-7 and weight-15 vectors are in the coset $C_2+1$. As stated, the diagonal entries in the same coset of $C_2$ in $C_1$ are identical. As an example, assume that for a $[[4,1,2]]$ CSS(X, $C_2=\langle[1,1,1,1]\rangle$; Z, $C_1^\perp=\langle[1,1,1,1],[0,1,1,0]\rangle$, y=0) code having a non-zero Z-logical $\gamma=[1,1,0,0]$. Given a target logical T gate in which $$T = |0\rangle\langle0| + e^{i\pi/4}|1\rangle\langle1| = \frac{1}{2}\left(1+e^{\frac{i\pi}{4}}\right)E(0,0) + \frac{1}{2}\left(1-e^{\frac{i\pi}{4}}\right)E(0,1)$$

at the third level of the Clifford hierarchy, then the system 100 obtains $$A_{0,0} = \frac{1}{4}(d_{[0,0,0,0]} + d_{[1,1,1,1]} + d_{[0,1,1,0]} + d_{[1,0,0,1]}) = \frac{1}{2}\left(1+e^{\frac{i\pi}{4}}\right) \text{ and} \quad (40)$$

$$A_{0,[1,1,0,0]} = \frac{1}{4}(d_{[0,0,0,0]} + d_{[1,1,1,1]} - d_{[0,1,1,0]} - d_{[1,0,0,1]}) = \frac{1}{2}\left(1-e^{\frac{i\pi}{4}}\right) \quad (41)$$

so that $$d_{[0,0,0,0]} = d_{[1,1,1,1]} = 1 \text{ and } d_{[0,1,1,0]} = d_{[1,0,0,1]} = e^{\frac{i\pi}{4}}.$$

The diagonal elements of the physical gates and target logical gates are directly connected, which reduces the complexity for the system 100 in finding the logical operator when the size of the physical system is large. Here, one possible 2-local physical gate that satisfies these constraints is Control-Phase$_{12}T_3T_4$.

In block 204, the system 100 configures the quantum computing circuit to implement a quantum error correction protocol using the CSS code and at least one of the identified diagonal physical gates. For example, embodiments may be adapted to a magic state distillation (MSD) protocol concatenating two codes, one code inside the other (instead of directly using triorthogonal CSS codes). The [[n, k, d]] outer code can be chosen from the code family disclosed above, for example, a [[31,5,3]] code corresponding to m=5. The [[k, 1, d']] inner code is preserved by the logical gate induced by the transversal T gate ($T^{\otimes n}$) on the outer code. The induced logical operator of the inner code is a single T gate up to a Clifford unitary.

Figure 4:
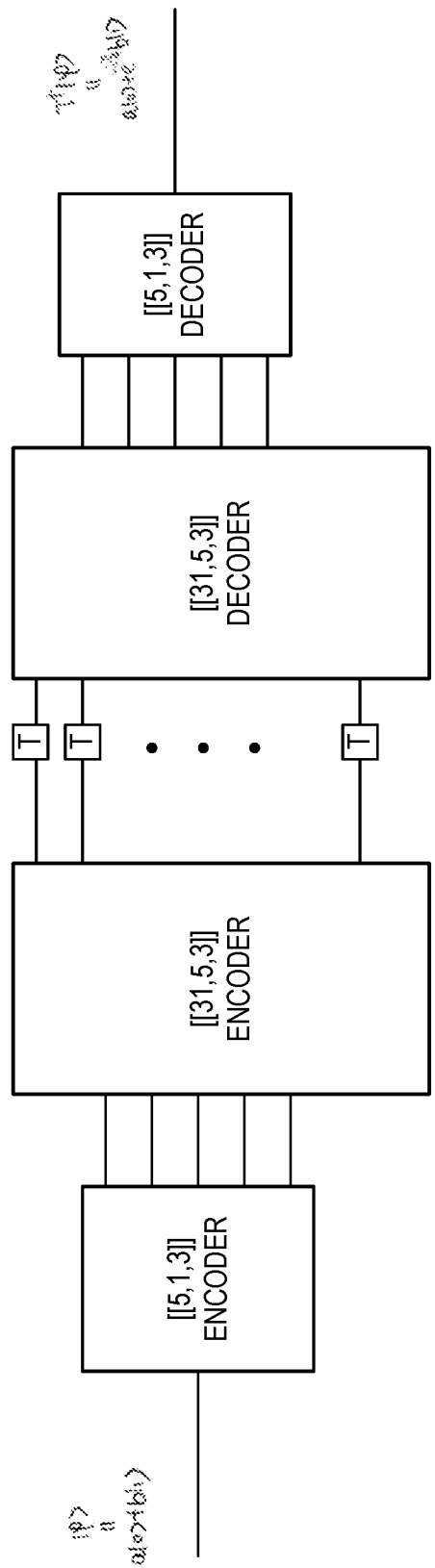
FIG. 4 is a conceptual diagram of a quantum circuit depicting CSS codes implemented in an example MSD protocol, according to an embodiment.

One possible inner code to be used in conjunction with the [[31,5,3]] outer code is the [[5,1,3]] stabilizer code. Referring now to FIG. 4, a conceptual quantum circuit diagram illustrating CSS codes implemented in a MSD protocol is shown. Particularly, FIG. 4 depicts a 31-to-1 MSD protocol in which the system 100 concatenates a [[31,5,3]] CSS code with a [[5,1,3]] stabilizer code. The performance of 31-to-1 MSD protocol has the same distillation curve as the 15-to-1 scheme, while the several-layer design/technique makes it possible to reach a multiplicity of potential MSD protocols.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

EXAMPLES

Illustrative examples of the technologies disclosed herein are provided below. An embodiment of the technologies may include any one or more, and any combination of, the examples described below.

Example 1 includes a computer-implemented method for performing error correction in a quantum circuit of a quantum computing system, comprising selecting, by the quantum computing system, a quantum error correction code (QECC), the QECC being associated with a codespace; identifying, by the quantum computing system and based on one or more properties of the QECC, one or more diagonal physical gates in the quantum circuit that induces a target logical gate and preserves the codespace; and configuring, by the quantum computing system, the quantum computing circuit to implement a quantum error correction protocol using the QECC and at least one of the identified one or more diagonal physical gates.

Example 2 includes the subject matter of Example 1, and wherein the QECC is a Calderbank-Shor-Steane (CSS) code.

Example 3 includes the subject matter of any of Examples 1 and 2, and wherein each diagonal physical gate comprises a plurality of diagonal entries, and further comprising indexing, by the quantum computing system, the diagonal entries.

Example 4 includes the subject matter of any of Examples 1-3, and further including, determining whether the indexed diagonal entries satisfy specified criteria.

Example 5 includes the subject matter of any of Examples 1-4, and wherein configuring the quantum computing circuit comprises, implementing, based on correlations of idling noise represented by the identified diagonal physical gates, a protocol incorporating at least the QECC to mitigate the correlations.

Example 6 includes the subject matter of any of Examples 1-5, and wherein configuring the quantum computing circuit to implement the quantum error correction protocol comprises constructing one or more QECCs that are oblivious to the identified diagonal physical gates.

Example 7 includes the subject matter of any of Examples 1-6, and wherein the quantum computing system is an ion trap quantum computing system.

Example 8 includes a quantum computing system, comprising a quantum circuit having a plurality of diagonal physical gates; a processor; a controller comprising a memory having a plurality of instructions, which, when executed by the processor, causes the quantum computing system to select a quantum error correction code (QECC), the QECC being associated with a codespace; identify, based on one or more properties of the QECC, one or more of the diagonal physical gates in the quantum circuit that induces a target logical gate and preserves the codespace; and configure the quantum computing circuit to implement a quantum error correction protocol using the QECC and at least one of the identified one or more of the plurality of diagonal physical gates.

Example 9 includes the subject matter of Example 8, and wherein the QECC is a Calderbank-Shor-Steane (CSS) code.

Example 10 includes the subject matter of any of Examples 8 and 9, and wherein each diagonal physical gate comprises a plurality of diagonal entries, and wherein the plurality of instructions further causes the quantum computing system to index the diagonal entries.

Example 11 includes the subject matter of any of Examples 8-10, and wherein the plurality of instructions further causes the quantum computing system to determine whether the indexed diagonal entries satisfy specified criteria.

Example 12 includes the subject matter of any of Examples 8-11, and wherein to configure the quantum computing circuit comprises, to implement, based on correlations of idling noise represented by the identified diagonal physical gates, a protocol incorporating at least the QECC to mitigate the correlations.

Example 13 includes the subject matter of any of Examples 8-12, and wherein to configure the quantum computing circuit to implement the quantum error correction protocol comprises to construct one or more QECCs that are oblivious to the identified diagonal physical gates.

Example 14 includes the subject matter of any of Examples 8-13, and wherein the quantum computing system is an ion trap quantum computing system.

Example 15 includes a computer-readable storage medium storing a plurality of instructions, which, when executed on a processor, causes a quantum computing system to select a quantum error correction code (QECC), the QECC being associated with a codespace; identify, based on one or more properties of the QECC, one or more of the diagonal physical gates in the quantum circuit that induces a target logical gate and preserves the codespace; and configure the quantum computing circuit to implement a quantum error correction protocol using the QECC and at least one of the identified one or more of the plurality of diagonal physical gates.

Example 16 includes the subject matter of Example 15, and wherein the QECC is a Calderbank-Shor-Steane (CSS) code.

Example 17 includes the subject matter of any of Examples 15 and 16, and wherein each diagonal physical gate comprises a plurality of diagonal entries, and wherein the plurality of instructions further causes the quantum computing system to index the diagonal entries.

Example 18 includes the subject matter of any of Examples 15-17, and wherein the plurality of instructions further causes the quantum computing system to determine whether the indexed diagonal entries satisfy specified criteria.

Example 19 includes the subject matter of any of Examples 15-18, and wherein to configure the quantum computing circuit comprises, to implement, based on correlations of idling noise represented by the identified diagonal physical gates, a protocol incorporating at least the QECC to mitigate the correlations.

Example 20 includes the subject matter of any of Examples 15-19, and wherein to configure the quantum computing circuit to implement the quantum error correction protocol comprises to construct one or more QECCs that are oblivious to the identified diagonal physical gates.

The invention claimed is:

1. A computer-implemented method for performing error correction in a quantum circuit of a quantum computing system, comprising:
   selecting, by the quantum computing system, a quantum error correction code (QECC), the QECC being associated with a codespace;
   identifying, by the quantum computing system and based on one or more properties of the QECC, one or more diagonal physical gates in the quantum circuit that induces a target logical gate and preserves the codespace; and
   configuring, by the quantum computing system, the quantum computing circuit to implement a quantum error correction protocol using the QECC and at least one of the identified one or more diagonal physical gates, wherein configuring the quantum computing circuit comprises implementing, based on correlations of idling noise represented by the identified diagonal physical gates, a protocol incorporating at least the QECC to mitigate the correlations.

2. The computer-implemented method of claim 1, wherein the QECC is a Calderbank-Shor-Steane (CSS) code.

3. The computer-implemented method of claim 1, wherein each diagonal physical gate comprises a plurality of diagonal entries, and further comprising indexing, by the quantum computing system, the diagonal entries.

4. The computer-implemented method of claim 3, further comprising, determining whether the indexed diagonal entries satisfy specified criteria.

5. The computer-implemented method of claim 1, wherein configuring the quantum computing circuit to implement the quantum error correction protocol comprises constructing one or more QECCs that are oblivious to the identified diagonal physical gates.

6. The computer-implemented method of claim 1, wherein the quantum computing system is an ion trap quantum computing system.

7. A quantum computing system, comprising:
   a quantum circuit having a plurality of diagonal physical gates;
   a processor;
   a controller comprising a memory having a plurality of instructions, which, when executed by the processor, causes the quantum computing system to:
      select a quantum error correction code (QECC), the QECC being associated with a codespace;
      identify, based on one or more properties of the QECC, one or more of the diagonal physical gates in the quantum circuit that induces a target logical gate and preserves the codespace; and
      configure the quantum computing circuit to implement a quantum error correction protocol using the QECC and at least one of the identified one or more of the plurality of diagonal physical gates, wherein to configure the quantum computing circuit comprises to implement, based on correlations of idling noise represented by the identified diagonal physical gates, a protocol incorporating at least the QECC to mitigate the correlations.

8. The quantum computing system of claim 7, wherein the QECC is a Calderbank-Shor-Steane (CSS) code.

9. The quantum computing system of claim 7, wherein each diagonal physical gate comprises a plurality of diagonal entries, and wherein the plurality of instructions further causes the quantum computing system to index the diagonal entries.

10. The quantum computing system of claim 9, wherein the plurality of instructions further causes the quantum computing system to determine whether the indexed diagonal entries satisfy specified criteria.

11. The quantum computing system of claim 7, wherein to configure the quantum computing circuit to implement the quantum error correction protocol comprises to construct one or more QECCs that are oblivious to the identified diagonal physical gates.

12. The quantum computing system of claim 7, wherein the quantum computing system is an ion trap quantum computing system.

13. A non-transitory computer-readable storage medium storing a plurality of instructions, which, when executed on a processor, causes a quantum computing system to:
   select a quantum error correction code (QECC), the QECC being associated with a codespace;
   identify, based on one or more properties of the QECC, one or more of the diagonal physical gates in the quantum circuit that induces a target logical gate and preserves the codespace; and
   configure the quantum computing circuit to implement a quantum error correction protocol using the QECC and at least one of the identified one or more of the plurality of diagonal physical gates, wherein to configure the quantum computing circuit comprises to implement, based on correlations of idling noise represented by the identified diagonal physical gates, a protocol incorporating at least the QECC to mitigate the correlations.

14. The non-transitory computer-readable storage medium of claim 13, wherein the QECC is a Calderbank-Shor-Steane (CSS) code.

15. The non-transitory computer-readable storage medium of claim 13, wherein each diagonal physical gate comprises a plurality of diagonal entries, and wherein the plurality of instructions further causes the quantum computing system to index the diagonal entries.

16. The non-transitory computer-readable storage medium of claim 15, wherein the plurality of instructions further causes the quantum computing system to determine whether the indexed diagonal entries satisfy specified criteria.

17. The non-transitory computer-readable storage medium of claim 13, wherein to configure the quantum computing circuit to implement the quantum error correction protocol comprises to construct one or more QECCs that are oblivious to the identified diagonal physical gates.

* * * * *